(12) United States Patent
Fahrländer et al.

(10) Patent No.: US 6,989,670 B2
(45) Date of Patent: Jan. 24, 2006

(54) DEVICE FOR MEASURING PATHS AND/OR POSITIONS

(75) Inventors: Klaus Fahrländer, Denkingen (DE); Dierk Tille, Tuttlingen (DE)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 10/809,258

(22) Filed: Mar. 25, 2004

(65) Prior Publication Data

US 2004/0232907 A1  Nov. 25, 2004

Related U.S. Application Data

(63) Continuation of application No. PCT/DE02/03653, filed on Sep. 26, 2002.

(30) Foreign Application Priority Data

Sep. 27, 2001 (DE) ................. 101 47 849

(51) Int. Cl.
*G01B 7/14* (2006.01)
*G01R 33/07* (2006.01)

(52) U.S. Cl. .................. 324/207.26; 324/207.2; 324/251

(58) Field of Classification Search .......... 324/207.13, 324/207.2–207.24, 207.26, 173, 174, 251, 324/244, 259–261; 338/32 R, 32 H
See application file for complete search history.

(56) References Cited

U.S. PATENT DOCUMENTS

| 5,850,142 A | * | 12/1998 | Rountos et al. ......... 324/207.2 |
| 5,955,881 A | * | 9/1999 | White et al. ............. 324/207.2 |
| 6,178,821 B1 | | 1/2001 | Savkar et al. |

FOREIGN PATENT DOCUMENTS

| DE | 40 38 674 A1 | 6/1992 |
| DE | 44 00 616 C2 | 7/1995 |
| DE | 100 10 042 A1 | 7/2001 |
| DE | 100 23 654 A1 | 11/2001 |
| EP | 0 213 732 A1 | 3/1987 |
| EP | 0 907 068 A1 | 4/1999 |
| EP | 1 099 929 A1 | 5/2001 |
| JP | 58-050404 A1 | 3/1983 |
| WO | WO 97/16736 | 5/1997 |

* cited by examiner

*Primary Examiner*—Bot LeDynh
(74) *Attorney, Agent, or Firm*—Burr & Brown

(57) ABSTRACT

A path and/or position measuring device is provided, including a magnet and a sensor for detecting the magnetic field intensity. The magnet and/or the sensor cooperate with a movable element. The magnet is formed such that the magnetic field intensity varies along an axis of the magnet and is not constant. The relative movement between the sensor and the magnet is substantially in the direction of the axis of the magnet. The path and/or the position of the movable element can be determined based on the magnetic field intensity detected by the sensor.

23 Claims, 5 Drawing Sheets

DEVICE FOR MEASURING PATHS AND/OR POSITIONS

CROSS REFERENCE TO RELATED APPLICATIONS

This application is a continuation of International Application No. PCT/DE02/03653 having an international filing date of Sep. 26, 2002, which designated the United States, the entirety of which is incorporated herein by reference.

This application also claims the benefit of German Application No. 101 47 849.6, filed Sep. 27, 2001, the entirety of which is incorporated herein by reference.

FIELD OF THE INVENTION

The present invention relates to a path and/or position measuring device.

Such path and/or position measuring devices are used in domestic appliances. For example, in a washing machines, the path measuring device can detect the loading of the laundry drum and the position measuring device can detect the vibrational behavior of the laundry drum.

BACKGROUND OF THE INVENTION

DE 40 38 674 A1 discloses a magnetically operating path and/or position measuring device. This has a conventional permanent magnet and a sensor detecting the magnetic field intensity. The magnet and/or the sensor co-operate with a movable element, so that a relative movement between the sensor and the magnet can be brought about by means of the movable element. In the magnetic circuit there is a rail which is made of material with good magnetic conduction and is arranged obliquely with respect to the relative movement, whereby the magnetic field intensity is influenced in a way corresponding to the relative movement, so that the path and/or the position of the movable element can be determined on the basis of the magnetic field intensity detected by the sensor. Instead of such a rail, an increasing air gap may also be provided between the magnet and the sensor, producing a smaller field intensity at the sensor, dependent nonlinearly on the distance between the magnet and the sensor. A disadvantage of devices of such a design appears to be their low sensitivity, inadequate accuracy and also the effort involved in evaluating the magnetic field intensity for the path and/or position determination.

Furthermore, EP 1 099 929 A1 discloses a path and/or position measuring device comprising a magnet which is formed in such a way that the magnetic field intensity varies along an axis of the magnet. A movable element co-operates with the magnet, whereby a relative movement between the sensor and the magnet substantially in the direction of this axis of the magnet can be brought about. On the basis of the magnetic field intensity detected by the sensor, the path and/or the position of the movable element can in turn be determined. A disadvantage of this path and/or position measuring device appears to be its large and complex mechanical form.

SUMMARY OF THE INVENTION

The invention is based on the object of making the path and/or position measuring device simpler and in particular increasing its accuracy.

This object is achieved in the case of a path and/or position measuring device of the generic type by the characterizing features of claim 1.

In the case of the path and/or position measuring device according to the invention, unlike a conventional bar-shaped permanent magnet, the magnet is formed in such a way that the magnetic field intensity varies along an axis of the magnet. The magnet is fastened to the movable element and consequently arranged in the device in such a way that the relative movement is substantially in the direction of this axis of the magnet. Consequently, the sensitivity and accuracy of the path and/or position measuring device can be adapted to the respective requirements in a simple way by the form of the magnet. Further refinements of the invention are the subject of the subclaims.

The sensor in the path and/or position measuring device expediently generates an electrical output voltage in dependence on the magnetic field intensity. The electrical output voltage can be further evaluated in a way which is customary per se by means of an electronic circuit, a microcomputer or the like. For the sake of simplicity, the output voltage may be substantially proportional to the sensed magnetic field intensity, to be precise in particular to the flux density associated with the respective magnetic field intensity.

The known physical measuring methods are suitable for detecting the magnetic field intensity. In particular, the sensor may be an analog type of Hall sensor, GMR sensor or the like.

In a particularly advantageous refinement, the magnet has a ramp- or wedge-shaped form in the direction of the axis, which is accompanied by a linear change in the height of the magnet in the direction of the axis. As a result, the flux density variation for the magnetic field in the direction of the axis is substantially linear. In addition, the air gap between the magnet and the sensor in the path and/or position measuring device can be substantially constant along the direction of the axis. Such a path and/or position measuring device has a constant resolution in the entire measuring range and also constant sensitivity.

The magnet can be produced in its desired form in a low-cost way by injection molding. For this purpose, the magnet consists of polymer-bonded magnetic particles. The magnet may be fastened to the movable element with a latching engagement, fitted into the movable element, integrated into the movable element or the like. If the polymer-bonded magnet is produced by injection molding, it is also appropriate for the sake of simplicity to mold the magnet into the movable element in the manner of a two-component part.

A path and/or position measuring device which, on account of its low cost, is suitable in particular for use in domestic appliances, such as washing machines, laundry dryers or the like, has a push rod as its movable element, it being possible for the push rod to be mounted in a linearly movable manner in a housing. The magnet may be fastened to the push rod in such a way that the axis of the magnet is aligned approximately parallel to the longitudinal axis of the push rod.

In order to provide the path and/or position measuring device with its own intelligence, the sensor, which is designed in particular in the manner of an integrated circuit, is arranged on a printed circuit board, it being possible that electronics for the evaluation of the sensor signal are additionally provided on the printed circuit board. A securing means for fastening the printed circuit board is expediently arranged in the housing. Finally, a plug-in receptacle for a connector for the electrical connection to the printed circuit board may be arranged on the housing, to be precise in particular on the securing means.

In particular in a washing machine or a laundry dryer, the path and/or position measuring device is articulated on the one hand on the movable element, that is the drum, and on the other hand on a fixed element, that is the frame. For the articulation of the push rod on the movable element and of the housing of the path and/or position measuring device on the frame, a ball joint and a fastening plate are preferred, for the sake of simplicity.

The advantages achieved by the invention are, in particular, that the path and/or position measuring device can be produced in a low-cost and simple manner and can therefore be used in cost-sensitive mass produced articles, such as domestic appliances or the like. Nevertheless, the path and/or position measuring device operates very accurately and also sensitively, so that it can also be used in safety-critical applications, for example in motor vehicles. It is particularly advantageous that the output signal generated by the sensor can be evaluated in a simple and quick manner with regard to the path and/or position determination. Furthermore, the resolution and the output signal achieved can be influenced in a simple way by the form of the magnet, in particular by its gradient in the direction of its axis corresponding to the ramp-shaped form.

BRIEF DESCRIPTION OF THE DRAWINGS

An exemplary embodiment of the invention is described in more detail below and represented in the drawings, in which.

DETAILED DESCRIPTION OF THE INVENTIONS

Figure 1:
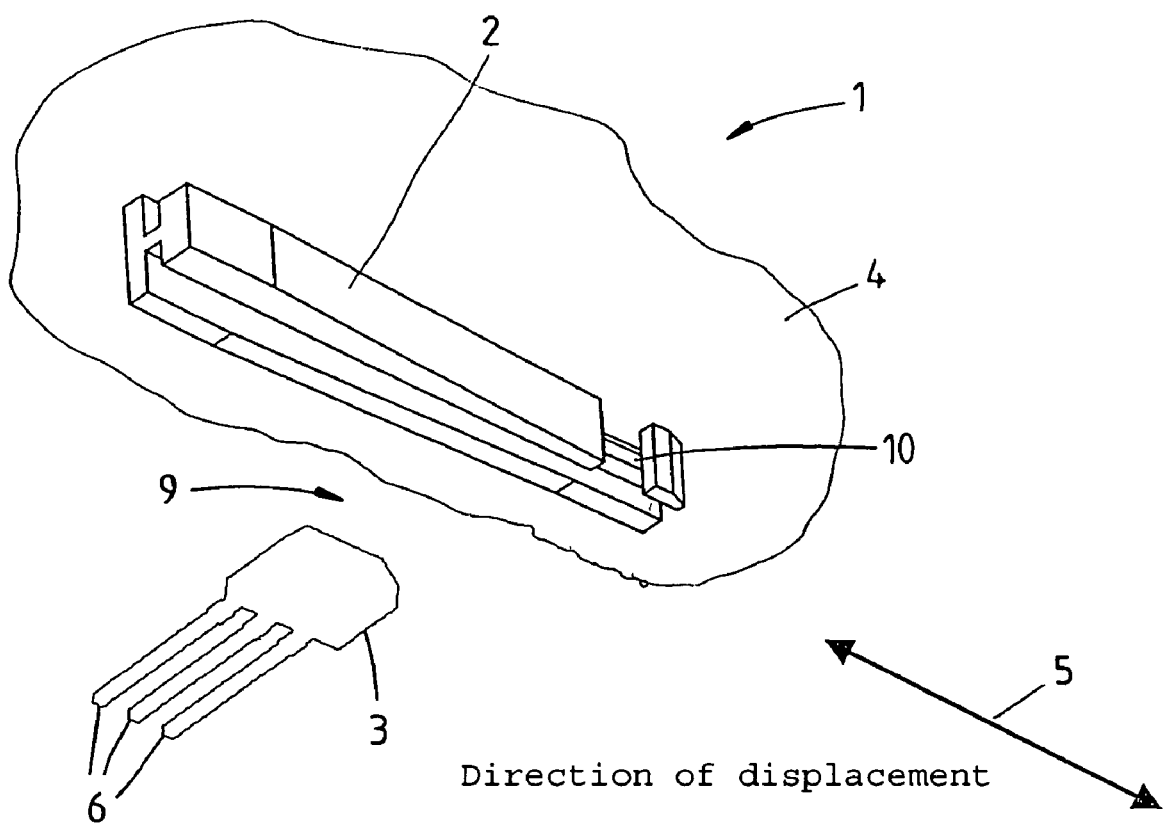
FIG. 1 schematically shows a path and/or position measuring device in a perspective representation in the manner of a basic diagram.

FIG. 1, serving as a basic diagram, shows a path and/or position measuring device 1, which comprises a magnet 2 and a sensor 3 detecting the magnetic field intensity. The magnet 2 and/or the sensor 3 co-operates with a movable element 4, so that a relative movement between the sensor 3 and the magnet 2 can consequently be brought about by means of the movable element 4. In the present case, the magnet 2 is arranged on the movable element 4, which is merely indicated schematically. The magnet 2 is then formed in such a way that the magnetic field intensity along an axis 5 of the magnet 2 varies and is consequently not constant. The magnet 2 is arranged in such a way that the relative movement is substantially in this direction of the axis 5 of the magnet 2. As a result, the path and/or the position of the movable element 4 can be determined on the basis of the magnetic field intensity respectively detected by the sensor 3.

Various further refinements of the path and/or position measuring device 1 are explained in more detail below.

Figure 2:
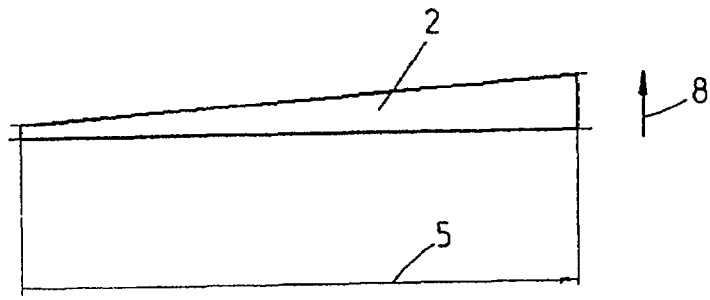
FIG. 2 shows the flux density variation in dependence on the path as a characteristic curve for the path and/or position measuring device according to FIG. 1.
Figure 2:
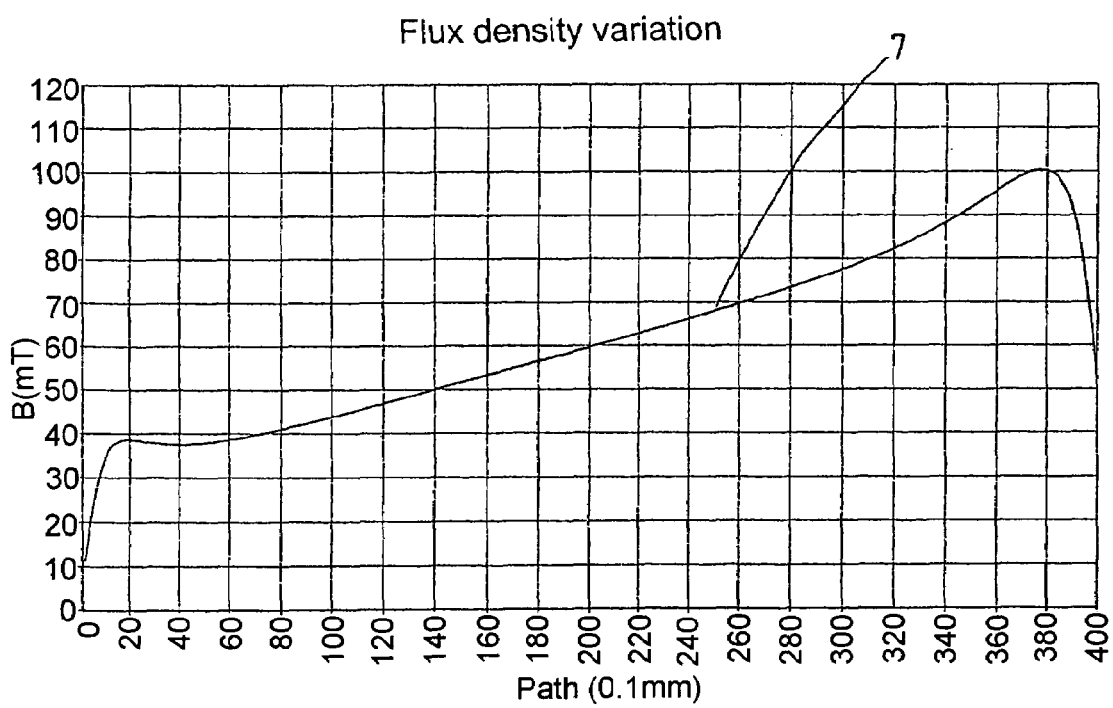

The sensor 2 generates an electrical output voltage in dependence on the magnetic field intensity, which can be picked up at the terminals 6 of the sensor 3. The output voltage is substantially proportional to the sensed magnetic field intensity. Similarly, the output voltage is proportional to the flux density associated with the respective magnetic field intensity, as can also be seen on the basis of the characteristic curve 7 for the flux density B of the magnet 2 in FIG. 2. The characteristic curve 7 is represented in FIG. 2 in dependence on the path in the direction of the axis 5 along the magnet 2, to be precise along a line that is central in relation to the width of the magnet and parallel to and at a certain distance from the horizontal bottom surface of the magnet 2. The side view of the magnet 2 is shown here.

The sensor 2 may be a Hall sensor, a GMR sensor or the like. An analog type of Hall sensor is preferred.

The magnet 2 has a ramp- or wedge-shaped form in the direction of the axis 5, as revealed in particular by FIG. 2. This ramp is formed in such a way that the magnet 2 has a linear change in its height 8 in the direction of the axis 5. As a result, the flux density variation B for the magnetic field in the direction of the axis 5 is also substantially linear, which the characteristic curve 7 shows. Nonlinear effects only occur at the ends of the magnet 2, so that the operating range of the path and/or position measuring device 1 is preferably chosen inward from the two ends of the magnet 2. As can be seen in FIG. 1, the sensor 3 is arranged in relation to the magnet 2 in such a way that the air gap 9 between the magnet 2 and the sensor 3 is substantially constant along the direction of the axis 5.

The ramp- or wedge-shaped form of the magnet 2 may be produced from a conventional bar magnet by corresponding working. However, it is preferred for the magnet 2 to consist of polymer-bonded magnetic particles. In this case, the magnet 2 can be produced in a simple manner by injection molding.

The magnet 2 is fastened to the movable element 4. A detent 10 is provided on the magnet 2 for the fastening, so that the magnet 2 can engage in a latching manner on the movable element 4. It goes without saying that the magnet 2 may also be fitted or integrated in the movable element 4 in some other way. The movable element 4 generally consists of plastic and is produced in a customary manner by injection molding. If it is a polymer-bonded magnet 2, it is then appropriate to mold the magnet 2 into the movable part 4 in the manner of a two-component part during the production of the movable element 4.

Figure 3:
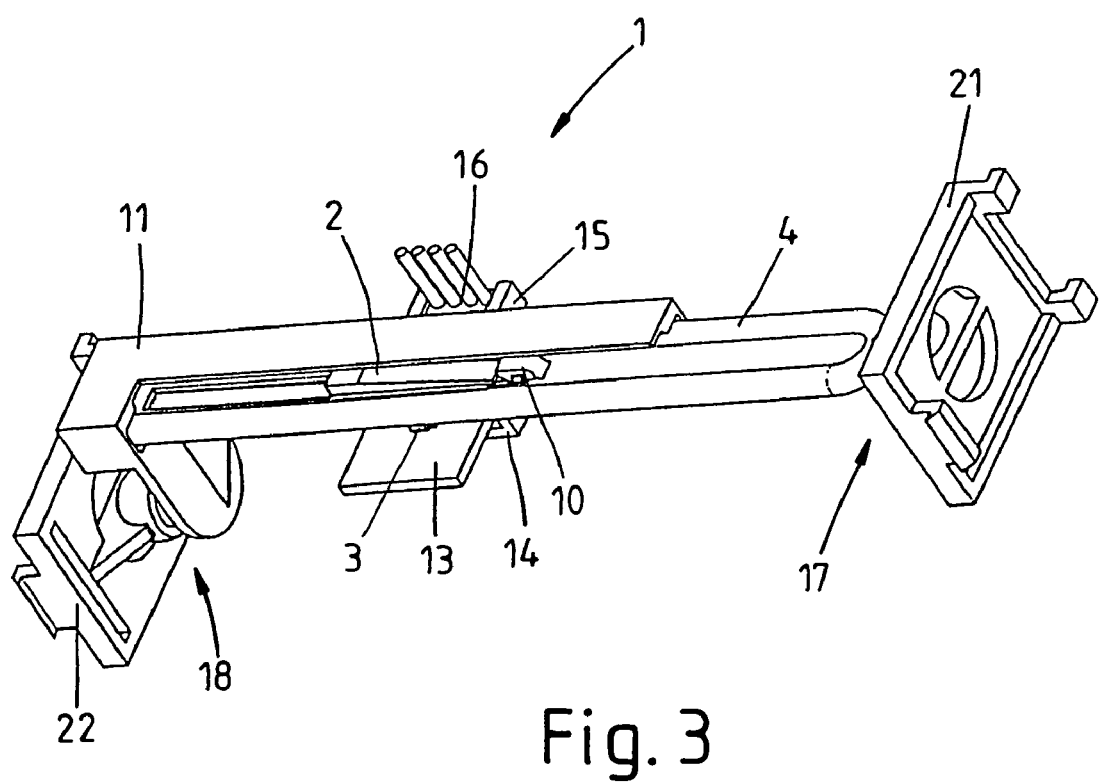
FIG. 3 shows the path and/or position measuring device in a more detailed form, likewise in a perspective representation.
Figure 4:
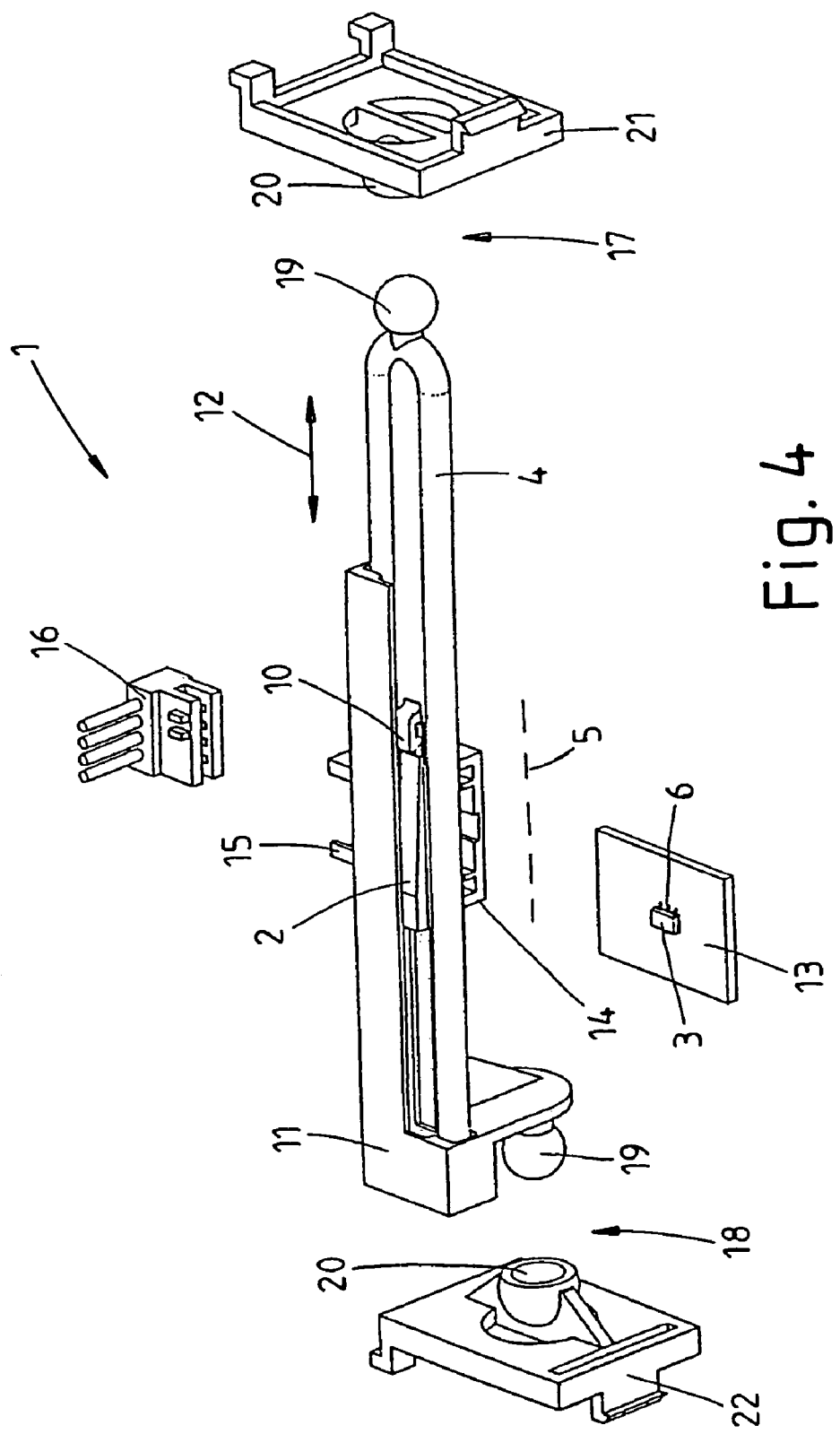
FIG. 4 shows the path and/or position measuring device from FIG. 3 in an exploded representation.

FIGS. 3 and 4 show the more detailed form of a path and/or position measuring device 1, which is intended in particular for a washing machine, a laundry dryer or the like for detecting vibrations and/or the loading of the drum.

The path and/or position measuring device 1 has a housing 11. The movable element comprises a push rod 4, which is mounted in a linearly movable manner in the housing 11. The ramp- or wedge-shaped magnet 2 is fastened to the push rod 4 in such a way, by being clipped in, molded around it or the like, that the direction of the axis 5 of the magnet 2 depicted by dashed lines in FIG. 4 is aligned approximately parallel to the direction of the longitudinal axis 12 of the push rod 4. The sensor 3, which is a Hall sensor, is designed in the manner of an integrated circuit and arranged on a printed circuit board 13. Electronics for evaluating the sensor signal generated by the sensor 3 may be additionally provided on the printed circuit board 13, but this is not shown any further. In the housing 11 there is a securing means 14 for the fastening of the printed circuit board 13. Finally, a plug-in receptacle 15 for a connector 16 is arranged on the housing 11, to be precise on the securing means 14. The connector 16 serves for the electrical connection to the printed circuit board 13, whereby the electrical voltage for operating the path and/or position measuring device 1 is supplied and the data generated by the path and/or position measuring device 1 are passed on.

Figure 5:
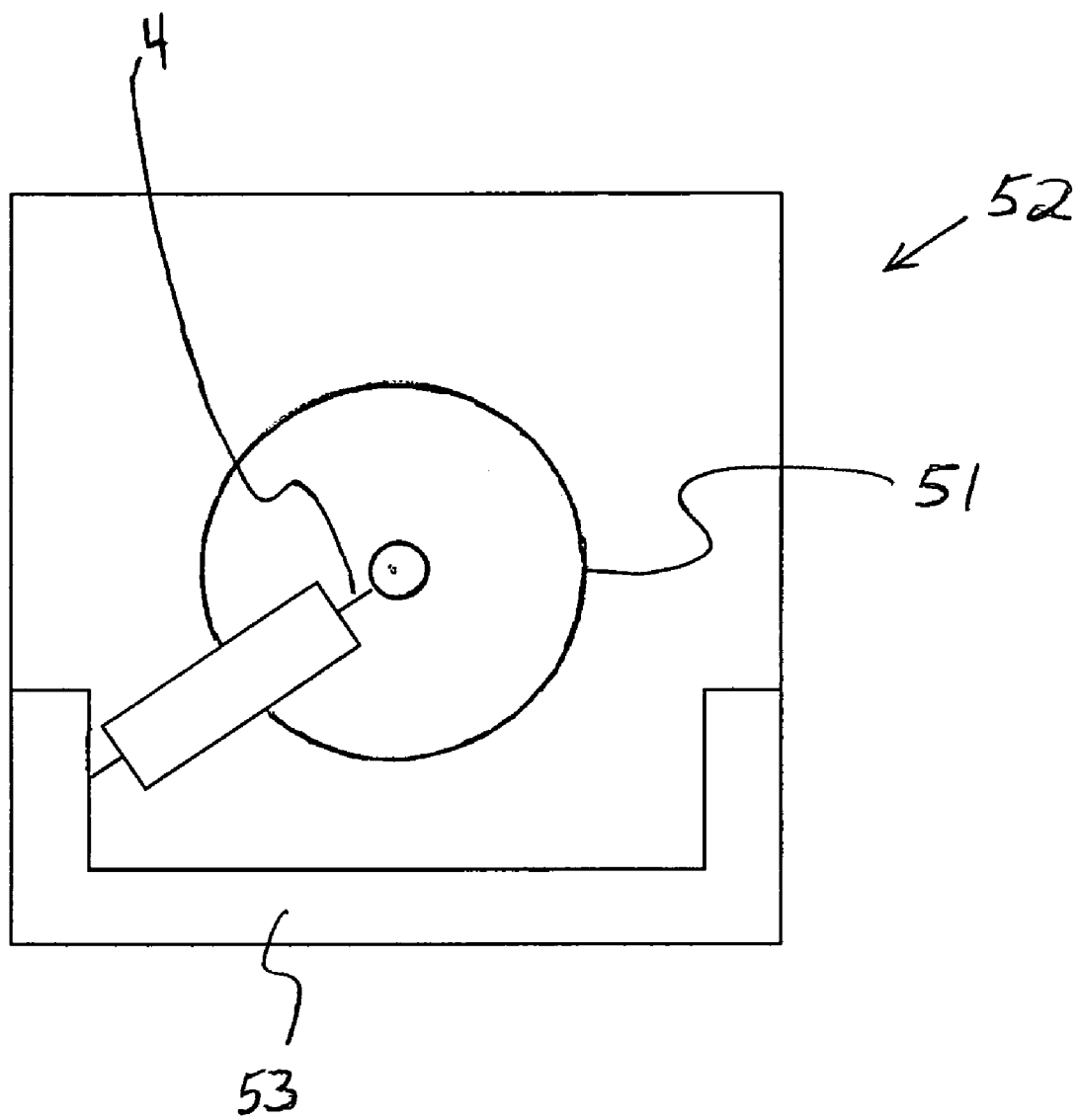
FIG. 5 schematically shows a path and/or position measuring device wherein the movable part of the device is articulated on a drum of a washing machine and on a fixed part of a washing machine.

The path and/or position measuring device 1 is articulated on the one hand on the drum of the washing machine, the laundry dryer or the like and on the other hand on its frame. The ball joint 17 serves for the articulation on the drum. The ball joint 17 comprises a ball 19, which is fastened to the push rod 4, and also a ball socket 20, in which the ball 19 is mounted. The ball socket 20 is located on a fastening plate 21, which in turn is fastened to the drum as a movable part, in order in this way to transfer the movements of the drum to the push rod 4. A ball joint 18 likewise serves for the articulation on the housing 11, the ball 19 being arranged on the housing 11 and the ball joint 20 being arranged on the fastening plate 22. The fastening plate 22 is in turn arranged on the frame as a fixed part of the washing machine, the laundry dryer or the like. FIG. 5 schematically depicts an arrangement as described above, i.e., in which the movable part 4 of the device is articulated on the one hand on a drum 51 of a washing machine 52 and on the other hand on a fixed part 53 of the washing machine 52.

The invention is not restricted to the exemplary embodiment described and represented. Rather, it comprises all developments that can be carried out by a person skilled in the art within the scope of the invention defined by the patent claims. Consequently, the path and/or position measuring device 1 can be used not only in other domestic appliances but also in motor vehicles, for example in motor vehicle locks, for chassis detection or the like.

LIST OF DESIGNATIONS

1: path and/or position measuring device
2: magnet
3: sensor
4: movable element/push rod
5: direction/axis of the magnet
6: terminal (on the sensor)
7: characteristic curve (for the flux density of the magnet)
8: height (of the magnet)
9: air gap
10: detent
11: housing
12: longitudinal axis (of push rod)
13: printed circuit board
14: securing means
15: plug-in receptacle
16: connector
17,18: ball joint
19: ball (of ball joint)
20: ball socket (of ball joint)
21,22: fastening plate

We claim:

1. A path/position measuring device comprising:
   a magnet fixed to a movable element;
   a sensor for detecting a magnetic field intensity; and
   a housing having securing means for securing a printed circuit board, said printed circuit board having an integrated circuit including electronics for evaluating a signal from said sensor, and a plug-in receptacle for a connector for establishing an electrical connection to said printed circuit board arranged on said securing means;
   wherein said sensor is arranged on said printed circuit board; and
   wherein said magnetic field intensity varies along an axis of said magnet such that a relative movement between said sensor and said magnet substantially in the direction of said axis is brought about by means of said movable element such that the path/position of said movable element is determined based on said magnetic field intensity detected by said sensor.

2. The path/position measuring device of claim 1, wherein said sensor generates an electrical output voltage depending upon said magnetic field intensity that is substantially proportional to said magnetic field intensity detected by said sensor.

3. The device of claim 2, wherein said electrical output voltage is substantially proportional to a flux density associated with said magnetic field intensity detected by said sensor.

4. The path/position measuring device of claim 1, wherein said sensor comprises one of a Hall sensor, and a GMR sensor.

5. The device of claim 4, wherein said sensor comprises an analog-type Hall sensor.

6. The path/position measuring device of claim 1, wherein said magnet has one of a ramp-shaped and a wedge-shaped form in said direction of said axis with respect to a linear change in a height of said magnet in said direction of said axis such that a flux density variation for said magnetic field in said direction of said axis is substantially linear, and wherein an air gap between said magnet and said sensor is substantially constant along said direction of said axis.

7. The path/position measuring device of claim 1, wherein said magnet consists of polymer-bonded magnetic particles produced by injection molding.

8. The device of claim 7, wherein said polymer-bonded magnet is molded into said movable element in the manner of a two-component part.

9. The path/position measuring device of claim 1, wherein said magnet is fastened to said movable element in a manner selected from the group consisting of a latching engagement manner, a fitting engagement manner wherein said magnet is fitted into said movable element, and an integrated manner wherein said magnet is integrated into said movable element.

10. A path/position measuring device comprising:
    a magnet fixed to a movable element, said movable element comprising a push rod mounted in a linearly movable manner in a housing, said push rod being articulated on a movable part at least by means of a first ball joint and said housing being arranged on a fixed part at least by means of a second ball joint; and
    a sensor for detecting a magnetic field intensity;
    wherein said magnetic field intensity varies along an axis of said magnet such that a relative movement between said sensor and said magnet substantially in the direction of said axis is brought about by means of said movable element such that the path/position of said movable element is determined based on said magnetic field intensity detected by said sensor.

11. The device of claim 10, wherein said axis of said magnet is aligned approximately parallel to a longitudinal axis of said push rod.

12. The device of claim 10, further comprising a plurality of fastening plates, wherein said push rod is articulated on said movable part by means of one of said fastening plates and wherein said housing is articulated on said fixed part by means of another of said fastening plates.

13. A path/position measuring device for a domestic appliance having a movable part and a fixed part, said device comprising:
- a magnet fastened to a movable element; and
- a sensor for detecting a magnetic field intensity;
- wherein said magnetic field intensity varies along an axis of said magnet such that a relative movement between said sensor and said magnet substantially in the direction of said axis is brought about by means of said movable element such that the path/position of said movable element is determined based on said magnetic field intensity detected by said sensor, and
- wherein said movable element of said device is articulated on a movable part of the domestic appliance and said sensor of said device is articulated on a fixed part of the domestic appliance.

14. The device of claim 13, wherein the movable part comprises a drum of the domestic appliance.

15. The device of claim 13, wherein the fixed part comprises a frame of the domestic appliance.

16. The device of claim 13, wherein the domestic appliance comprises one of a laundry washing machine and a laundry dryer.

17. A path/position measuring device comprising:
- a magnet fixed to a movable element, said movable element comprising a push rod mounted in a linearly movable manner in a housing, said push rod being articulated on a fixed part at least by means of a first ball joint and said housing being arranged on a movable part at least by means of a second ball joint; and
- a sensor for detecting a magnetic field intensity;
- wherein said magnetic field intensity varies along an axis of said magnet such that a relative movement between said sensor and said magnet substantially in the direction of said axis is brought about by means of said movable element such that the path/position of said movable element is determined based on said magnetic field intensity detected by said sensor.

18. A path/position measuring device for a domestic appliance having a movable part and a fixed part, said device comprising:
- a magnet fastened to a movable element; and
- a sensor for detecting a magnetic field intensity;
- wherein said magnetic field intensity varies along an axis of said magnet such that a relative movement between said sensor and said magnet substantially in the direction of said axis is brought about by means of said movable element such that the path/position of said movable element is determined based on said magnetic field intensity detected by said sensor; and
- wherein said movable element of said device is articulated on a fixed part of the domestic appliance and said sensor of said device is articulated on a movable part of the domestic appliance.

19. The device of claim 17, wherein said axis of said magnet is aligned approximately parallel to a longitudinal axis of said push rod.

20. The device of claim 17, further comprising a plurality of fastening plates, wherein said housing is arranged on said movable part by means of one of said fastening plates and wherein said push rod is articulated on said fixed part by means of another of said fastening plates.

21. The device of claim 18, wherein the movable part comprises a drum of the domestic appliance.

22. The device of claim 18, wherein the fixed part comprises a frame of the domestic appliance.

23. The device of claim 18, wherein the domestic appliance comprises one of a laundry washing machine and a laundry dryer.

* * * * *